US009936644B2

(12) United States Patent
Pourchet et al.

(10) Patent No.: US 9,936,644 B2
(45) Date of Patent: Apr. 10, 2018

(54) ROUND BALER WITH APPARATUS FOR GUIDING A PRESSING BELT

(71) Applicant: Deere & Company, Moline, IL (US)

(72) Inventors: Jeremy Pourchet, Chargey les Gray (FR); Manuel Marques, Grandvelle et le Perrenot (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/182,263

(22) Filed: Jun. 14, 2016

(65) Prior Publication Data

US 2016/0374272 A1    Dec. 29, 2016

(30) Foreign Application Priority Data

Jun. 16, 2015   (DE) .................. 10 2015 211 034

(51) Int. Cl.
| | | |
|---|---|---|
| *A01F 15/08* | (2006.01) | |
| *A01F 15/07* | (2006.01) | |
| *A01F 15/18* | (2006.01) | |

(52) U.S. Cl.
CPC .......... *A01F 15/0833* (2013.01); *A01F 15/07* (2013.01); *A01F 15/18* (2013.01); *A01F 2015/077* (2013.01); *A01F 2015/186* (2013.01)

(58) Field of Classification Search
CPC ... B30B 5/04; B30B 5/06; A01F 15/07; A01F 2015/186; A01F 2015/0795; A01F 2015/078; A01F 2015/077; A01F 15/18; A01F 15/0833
USPC ................... 100/87, 88, 76; 56/341
See application file for complete search history.

(56) References Cited

U.S. PATENT DOCUMENTS

| | | | |
|---|---|---|---|
| 3,687,273 A | | 8/1972 | Macone et al. |
| 3,992,987 A | * | 11/1976 | Sereg ...................... A01F 15/07 100/88 |
| 4,035,999 A | | 7/1977 | Crane et al. |
| 4,143,505 A | | 3/1979 | Sheesley et al. |
| 4,224,867 A | * | 9/1980 | Gaeddert ............ A01F 15/0833 100/88 |

(Continued)

FOREIGN PATENT DOCUMENTS

| | | |
|---|---|---|
| DE | 102011003727 A1 | 8/2012 |
| EP | 0095690 A1 | 12/1983 |

(Continued)

OTHER PUBLICATIONS

European Search Report in foreign counterpart application No. 16171869.7 dated Nov. 11, 2016 (7 pages).

*Primary Examiner* — Jimmy T Nguyen

(57) ABSTRACT

A round baler is provided with a bale-forming chamber that is surrounded by a pressing apparatus in the form of a single pressing belt or several pressing belts arranged one next to the other, wherein the pressing apparatus contacts a roller that can be driven and freely co-rotating rollers, of which at least one pre-tensioned roller is loaded by pre-tensioning apparatus in the sense of tightening the pressing apparatus such that it pre-tensions the pre-tensioned roller more strongly the farther this roller moves in a direction for loosening the pressing apparatus. The two ends of the pre-tensioned roller are each pre-tensioned by the pre-tensioning apparatus and can move independently of each other.

28 Claims, 2 Drawing Sheets

(56) References Cited

U.S. PATENT DOCUMENTS

| | | | | |
|---|---|---|---|---|
| 5,025,718 | A | * | 6/1991 | Viaud ................ A01F 15/0833 100/88 |
| 5,261,323 | A | | 11/1993 | Gunther et al. |
| 5,941,168 | A | | 8/1999 | Kluver et al. |
| 6,332,309 | B1 | * | 12/2001 | Rodewald ............... A01F 15/07 100/88 |
| 6,745,681 | B2 | * | 6/2004 | Lucand ................... A01F 15/07 100/88 |
| 7,918,158 | B2 | * | 4/2011 | Viaud ................ A01F 15/0833 100/45 |
| 2004/0000131 | A1 | * | 1/2004 | Viaud .................... A01F 15/07 56/341 |
| 2004/0031402 | A1 | * | 2/2004 | Viaud ................ A01F 15/0883 100/88 |
| 2007/0214970 | A1 | * | 9/2007 | Taylor .................... A01F 15/07 100/40 |
| 2012/0103208 | A1 | * | 5/2012 | Jahraus ............... A01F 15/0715 100/88 |

FOREIGN PATENT DOCUMENTS

| | | | |
|---|---|---|---|
| EP | 1364574 | A1 | 11/2003 |
| EP | 1396187 | A1 | 3/2004 |
| EP | 1813146 | A2 | 8/2007 |

\* cited by examiner

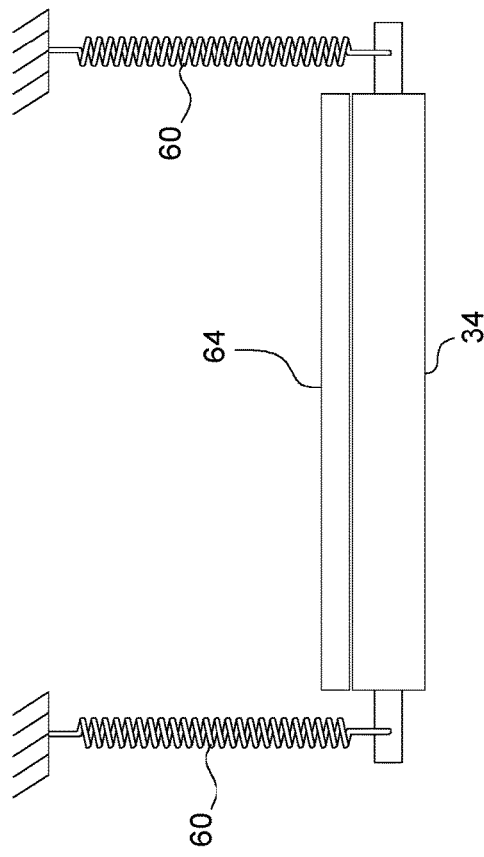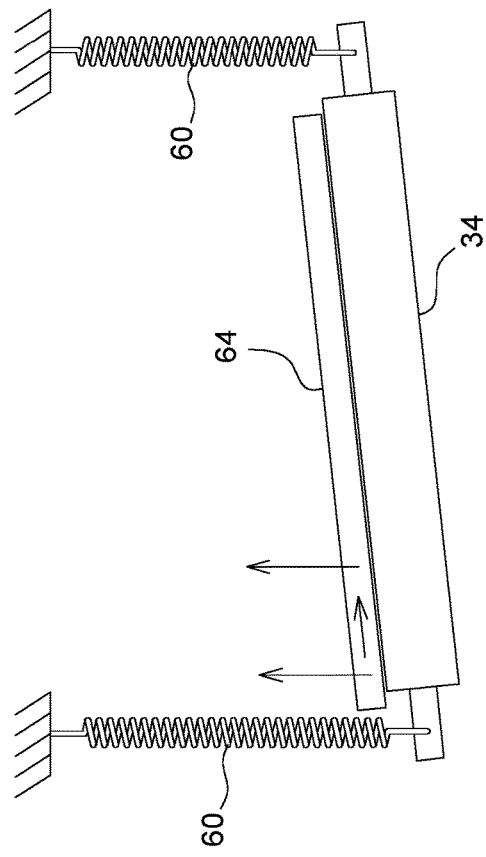

ROUND BALER WITH APPARATUS FOR GUIDING A PRESSING BELT

CROSS-REFERENCE TO RELATED APPLICATIONS

Pursuant to 35 USC § 119, this application claims the benefit of and priority to German patent application no. 102015211034.6, filed on Jun. 16, 2015, which is herein incorporated by reference in its entirety.

FIELD OF THE DISCLOSURE

The disclosure relates to a round baler with a bale-forming chamber and at least one pre-tensioned roller.

BACKGROUND

Round balers are used to form bales from stalk-shaped agricultural harvested produce. Such round balers have a bale-forming chamber and associated pressing means. After completing and optionally wrapping a bale with mesh, twine, or a film, the bale is ejected out the back of the bale-forming chamber.

In many round balers, especially in those with a variable bale size, the bale-forming chamber is partially or completely surrounded by one or more pressing belts. The pressing belt or belts wrap around the rollers, of which at least one can be driven. Some of the rollers are supported on the frame of the round baler and others can move relative to the frame, in order to adapt the bale-forming chamber to the gradually growing bale and to allow an ejection of a completed bale.

The partially driven, partially freely co-rotating rollers extend transverse to the forward direction and to the axis of the bale. Typically, a number of narrower pressing belts is distributed across the width of the bale-forming chamber or a single, wide pressing belt is used (cf. U.S. Pat. No. 5,941,168 A1).

Because a non-uniform loading of harvested produce across the width of the bale-forming chamber or a shifting of the harvested produce toward one side while working on a hill leads to a lateral displacement of the pressing belt, which can result in undesired rubbing of the pressing belt against the side wall of the round baler and incorrect measured values of a sensor interacting with the pressing belt for detecting the bale size, guides for the pressing belt have been proposed that are made from rigid elements contacting the pressing belt on the side (U.S. Pat. No. 5,261,323 A1). It has also been proposed to attach rings that project in the radial direction on one of the rollers, so that the individual pressing belts each run between two rings (U.S. Pat. No. 3,992,987 A1). It has further been proposed to implement the lateral guidance of the belt through grooved rollers that contact the belts on the side directly before a driven roller (DE 10 2011 003 727 A1).

U.S. Pat. No. 3,687,273 A describes a conveyor belt in which the lateral position of the belt is registered by rollers contacting the belt on the side. The rollers control a holder that is supported by springs on the frame on which a deflection roller of the belt is supported, such that the belt is pre-tensioned more strongly by the deflection roller on the side toward which the belt is running. In this way, the belt should be guided centrally on the deflection roller.

The known means for the lateral guidance of pressing belts causes increased friction of the belt on the guidance means, which requires, on one hand, drive energy and, on the other hand, results in wear of the belt.

SUMMARY

The present disclosure provides a round baler which does not have the disadvantages mentioned above or has them at a reduced degree.

A round baler is provided with a bale-forming chamber that is surrounded by a pressing apparatus in the form of a single pressing belt or multiple pressing belts arranged directly next to each other or forming only relatively small gaps. The pressing apparatus contacts a roller that can be driven and freely co-rotating rollers on which at least one pre-tensioned roller is loaded by pre-tensioning apparatus in the sense of tightening the pressing apparatus. The pre-tensioning apparatus are constructed such that the pre-tensioned rollers are pre-tensioned more strongly the farther these move in a direction leading to the loosening of the pressing apparatus. Consequently, they have an increasing characteristic curve, like what can be achieved with a hydraulic cylinder controlled by a spring or a position-detecting sensor. The two ends of the pre-tensioned rollers are each pre-tensioned by associated pre-tensioning apparatus and move independently of each other.

The pressing apparatus consequently revolves around the rollers pre-tensioned separately from each other on both ends. If the pressing apparatus is now tensioned non-uniformly across its width—for example, due to a non-cylindrical bale—which could have the result that it deviates from its desired position on the pre-tensioned roller, the pre-tensioned roller is deflected against the pre-tensioning of the pre-tensioning apparatus more toward the larger side of the bale (in the direction leading to the loosening of the pressing apparatus) than toward the other side. This increases the pre-tensioning force of the pre-tensioning apparatus on the larger side of the bale (due to the increasing characteristic curve of the pre-tensioning apparatus), which in turn has the result that material of the bale and, if it has left its desired position, also the pressing apparatus move in the other direction until they have again reached their desired positions. In this way, without lateral guides and without means for registering the position of the pressing apparatus, it is achieved that the pressing apparatus remain in its desired lateral position on the pre-tensioned roller also for non-cylindrical bales and thus also on the other rollers.

The pre-tensioned roller can be mounted on both ends on a holder that is hinged so that it can pivot on the frame of the round baler and is coupled with the pre-tensioning apparatus.

The positions of the ends of the pre-tensioned roller can be detected by a sensor. The signals of the sensors can be displayed to the operator, so that he or she can steer the tractor and the baler over the field in the sense of forming a cylindrical bale, or can be used by an automatic steering system in the mentioned sense.

BRIEF DESCRIPTION OF THE DRAWINGS

In the drawings, an embodiment that is described in more detail below is shown, wherein the reference symbols should not be used for limiting the features of the claims. Shown are:

FIG. 2 a schematic front view of a pre-tensioned roller of the round baler for proper running pressing apparatus, and FIG. 3 a schematic front view of a pre-tensioned roller of the round baler for pressing apparatus deviating toward the left from the proper path.

DETAILED DESCRIPTION

Figure 1:
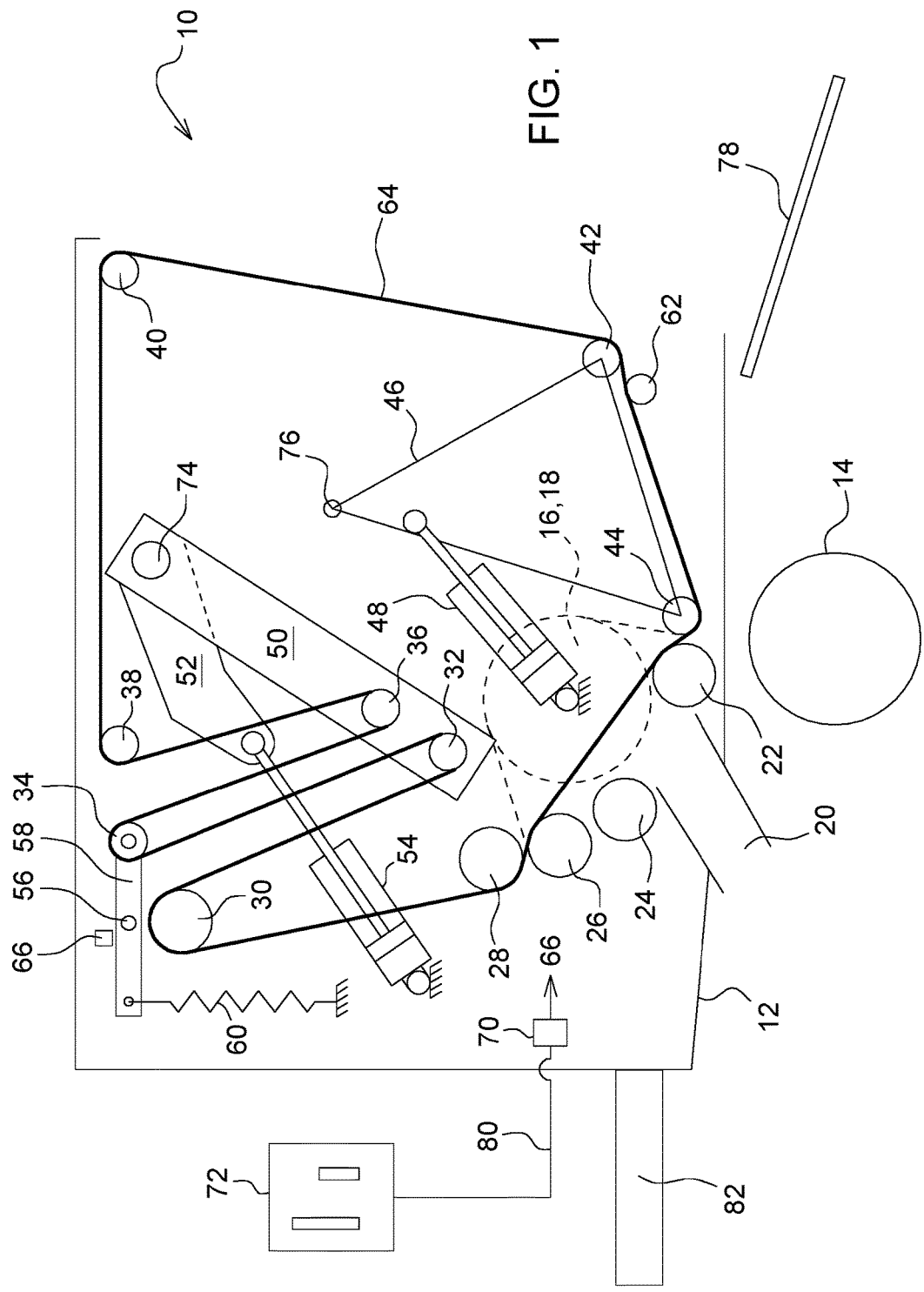
FIG. 1 a schematic side view of a round baler.

FIG. 1 shows a schematic side view of a round baler 10, which includes a frame 12 that is supported on wheels 14 and can be pulled by means of a tow bar 82 by a not-shown tractor over a field in its forward direction that runs, in FIG. 1, toward the left, in order to collect harvested produce by means of a not-shown pick-up device and to feed it via an inlet channel 20 into a bale-forming chamber 16, in which a bale 18 is then successively formed. The bale-forming chamber 16 is bounded by rollers 22, 24, 26 that are supported so that they can rotate in the frame 12 and are adjacent to the inlet channel 20. In addition, the bale-forming chamber 16 is bounded by an endless pressing apparatus 64 in the form of one or more belts arranged laterally one next to the other, which encloses or enclose additional rollers 28, 30, 32, 34, 36, 38, 40, 42, 62, and 44, as well as the roller 22, partially, of which one (e.g., the roller 30), multiple, or all rollers are driven to rotate during the formation of a bale 18 and the others co-rotate freely. The rollers 28, 30, 38, 40, and 22 are supported so that they can rotate in the frame 12, i.e., apart from their rotation about the longitudinal axis, they do not move relative to the frame 12, when a bale 18 is being formed.

The rollers 32 and 36 are each mounted on their two ends on a carrier 50 that is hinged on its upper end so that it can pivot about an axis 74 on the frame 12. The carrier 50 is coupled rigidly with an arm 52 that is pre-tensioned by means of a hydraulic cylinder 54. The carrier 50 thus moves during the creation of a bale 18 against a pressure present in the piston rod chamber of the hydraulic cylinder 54 set upward, if a bale 18 is created and the bale-forming chamber 16 gradually grows larger in that the pressing apparatus 64 bounding the bale-forming chamber 16 deflect upward and backward, as is shown in FIG. 1 with dashed lines.

The rollers 42, 62, and 44 are mounted on a pivot part 46 so that it can be pivoted backward and upward about an upper axis 76 by an actuator 48 in the form of a hydraulic cylinder, in order to eject a bale 18 from the bale-forming chamber 16. The bale 18 then rolls onto an unloading ramp 78 and onto the ground.

The pre-tensioned roller 34 is supported so that it can rotate on a holder 58, which is hinged on the frame 12 so that it can pivot about an axis 56 approximately in its center and is pre-tensioned by a spring 60. The spring 60 has the goal of tightening the pressing apparatus 64, in that it pulls the pre-tensioned roller 34 upward in the counterclockwise direction, and it is pulled farther the more the pre-tensioned roller 34 moves downward, i.e., in the direction of loosening of the pressing apparatus 64. On the other side of the round baler 10, there is also another holder 58 on which the pre-tensioned roller 34 is supported so that it can rotate, and another spring 60, wherein this holder and spring are independent from the components (holder 58 and spring 60) shown in FIG. 1 and thus can move independently of these parts.

The round baler 10 is known essentially from EP 1 396 187 A1 and EP 1 364 574 A1, whose disclosure is incorporated in the present document through this reference.

The function of the roller 34 pre-tensioned on its two ends independently from each other is shown in FIGS. 2 and 3. In FIGS. 2 and 3, the holder 58 is not shown for reasons of illustration, so that the springs 60 in the schematic diagrams directly attach to the axis of the pre-tensioned roller 34 and pull the latter upward on both ends (as is the case also in FIG. 1). In the situation according to FIG. 2, the pressing apparatus 64 run symmetric to the pre-tensioned roller 34.

If the bales 18 that are formed are not cylindrical, but conical, e.g., due to non-symmetrical feeding of the harvested produce into the bale-forming chamber 16 or feeding on the side of a hill, this leads to the situation according to FIG. 3, in which the left side of the bale 18 has a larger diameter than its right side. The bale 18 thus tensions the pressing apparatus 64 more strongly to the left than to the right. Because the pressing apparatus 64 is essentially not elastic overall, it cannot absorb even the different tension, but instead pulls the roller 34 farther to the left against the downward force of the spring 60 than to the right. Thus the left side of the roller 34 moves downward and the left spring 60 is more strongly tensioned than the right spring 60. Here, the pressing apparatus 64 can move slightly to the left on the roller 34, as shown, exaggerated for illustrative purposes, in FIG. 3. The resulting forces acting on the pressing apparatus 64 are indicated in FIG. 3 by arrows: The farther it moves to the left, the greater the force becomes pulling the pressing apparatus 64 upward, because the left spring 60 pulls the roller 34 upward more strongly than the right spring 60. That leads to a force component that pulls the pressing apparatus 64 on the roller 34 back to the right. Simultaneously, the material in the baler chamber 16 is also moved to the right, because it is compressed by the pressing apparatus 64 more strongly in the left part of the baler chamber 16 than in the right part. As a result, the situation according to FIG. 2 is finally obtained again.

If the pressing apparatus 64 were to deviate toward the right, the function would be analogous, only in the other direction.

For detecting the active spring forces, two sensors 66 are used, each of which detect the rotational position of the holder 58 about the axis 56 on another side of the round baler 10.

The spring forces depend on the tensile force in the pressing apparatus 64 that depends, in turn, on the size of the bale 18. The sensors 66 are designed, in particular, as potentiometers or some other kind of rotational angle sensor. The sensors 66 are connected to an evaluation circuit 70. Because the sensors 66 can move independently of each other, in the event of non-cylindrical bales 18, different values are detected by the two sensors 66. The output values of the sensors 66 are transmitted by the evaluation circuit 70 to a display device 72 that can be located, in particular, in the cabin of the tractor. For this purpose, in particular, a bus line 80 is used. The operator thus detects the shape of the bale 72 on the display device 72 with reference to two bar charts or some other representation and can countersteer if the bars are not the same size, in order to form a cylindrical bale. This task can also be taken over by an automatic system. For this purpose, refer to EP 1 813 146 A2, whose disclosure is incorporated into the present document through this reference.

Furthermore, the signal of the sensors 66 can be used to detect an overload of the round baler 10. If the output signal of the sensor 66 thus notes that a threshold is exceeded that corresponds to a maximum tension force in the pressing apparatus 64, a warning note can be given to the operator via the display device 72 and/or automatically lower the pressure in the piston rod chamber of the hydraulic cylinder 54 and thus the tension in the pressing apparatus 64. For this purpose, a proportional valve (not shown) can be controlled accordingly.

The invention claimed is:

1. A round baler comprising:
   a frame;
   a bale-forming chamber that is surrounded by a pressing apparatus in the form of a single pressing belt or multiple pressing belts arranged one next to the other, wherein the pressing apparatus contacts multiple rollers that can be driven and freely co-rotating rollers, of which at least one pre-tensioned roller having a first end and a second end is loaded by pre-tensioning apparatus connected to the first and second ends, such that the pre-tensioning apparatus pre-tensions the first end of the pre-tensioned roller greater than the second end of the pre-tensioned roller when the first end moves more than the second end in a direction leading to the loosening of the pressing apparatus; and
   wherein each of a plurality of positions of the ends of the pre-tensioned roller is configured to be detected by sensors that are connected to a display device, the sensors are rotational angle sensors.

2. The round baler of claim 1, wherein the pre-tensioning apparatus comprises a first spring coupled to the first end of the pre-tensioned roller and a second spring coupled to the second end of the pre-tensioned roller, when the first end moves more than the second end, the first spring deforms more than the second spring.

3. The round baler of claim 1, wherein the pre-tensioned roller is mounted on two ends on a holder that is hinged so that it can pivot on the frame of the round baler and is coupled with the pre-tensioning apparatus.

4. The round baler of claim 2, wherein when the pressing apparatus moves toward the first end which has a greater amount of force from the pressing apparatus than the second end, the pre-tensioning apparatus pulls the pressing apparatus back toward the second end.

5. A round baler comprising:
   a frame;
   a bale-forming chamber that is surrounded by a pressing apparatus in the form of a single pressing belt or multiple pressing belts arranged one next to the other, wherein the pressing apparatus contacts multiple rollers that can be driven and freely co-rotating rollers, of which at least one pre-tensioned roller is loaded by two springs with each of two ends of the at least one pre-tensioned roller being coupled to one of the two springs;
   wherein in a balanced condition, the two ends of the at least one pre-tensioned roller bear substantially equal amount of forces from the pressing belts;
   wherein in an unbalanced condition, the two ends of the at least one pre-tensioned roller bear different amount of forces, and then the springs are deformed and lead the pre-tensioned roller back the balanced condition; and
   wherein each of a plurality of positions of the ends of the pre-tensioned roller is configured to be detected by sensors that are connected to a display device, the sensors are rotational angle sensors.

6. The round baler of claim 5, wherein in the balanced conditioned, the pressing apparatus is substantially symmetric to the pre-tensioned roller.

7. The round baler of claim 5, wherein in the unbalanced condition, the pressing apparatus moves towards one of the two ends of pre-tensioned roller which has a greater amount of force from the pressing apparatus than the other end.

8. The round baler of claim 5, wherein the pressing apparatus is endless and formed an enclosure area subject to be changed when baling, and the pre-tensioned roller is within the enclosure area.

9. The round baler of claim 8, wherein one of the multiple rollers is positioned immediately before the pre-tensioned roller and another one of the multiple rollers is positioned immediately after the pre-tensioned roller and these two of the multiple rollers are outside the enclosure area.

10. The round baler of claim 9, wherein the two of the multiple rollers are coupled to a carrier configured to pivot about an axis on the frame.

11. The round baler of claim 10, wherein the carrier is coupled rigidly with an arm that is pre-tensioned by a hydraulic cylinder.

12. The round baler of claim 1, wherein the pressing apparatus is endless and formed an enclosure area subject to be changed when baling, and the pre-tensioned roller is within the enclosure area.

13. The round baler of claim 12, wherein one of the multiple rollers is positioned immediately before the pre-tensioned roller and another one of the multiple rollers is positioned immediately after the pre-tensioned roller and these two of the multiple rollers are outside the enclosure area.

14. The round baler of claim 13, wherein the two of the multiple rollers are coupled to a carrier configured to pivot about an axis on the frame.

15. The round baler of claim 14, wherein the carrier is coupled rigidly with an arm that is pre-tensioned by a hydraulic cylinder.

16. A round baler comprising:
   a frame;
   a bale-forming chamber that is surrounded by a pressing apparatus in the form of a single pressing belt or multiple pressing belts arranged one next to the other, wherein the pressing apparatus contacts multiple rollers that can be driven and freely co-rotating rollers, of which at least one pre-tensioned roller having a first end and a second end is loaded by pre-tensioning apparatus connected to the first and second ends, such that the pre-tensioning apparatus pre-tensions the first end of the pre-tensioned roller greater than the second end of the pre-tensioned roller when the first end moves more than the second end in a direction leading to the loosening of the pressing apparatus;
   wherein the pressing apparatus is endless and formed an enclosure area subject to be changed when baling, and the pre-tensioned roller is within the enclosure area; and
   wherein one of the multiple rollers is positioned immediately before the pre-tensioned roller and another one of the multiple rollers is positioned immediately after the pre-tensioned roller and these two of the multiple rollers are outside the enclosure area.

17. The round baler of claim 16, wherein the pre-tensioning apparatus comprises a first spring coupled to the first end of the pre-tensioned roller and a second spring coupled to the second end of the pre-tensioned roller, when the first end moves more than the second end, the first spring deforms more than the second spring.

18. The round baler of claim 16, wherein the pre-tensioned roller is mounted on two ends on a holder that is hinged so that it can pivot on the frame of the round baler and is coupled with the pre-tensioning apparatus.

19. The round baler of claim 16, wherein the positions of the ends of the pre-tensioned roller can each be detected by sensors that are connected to a display device, the sensors are rotational angle sensors.

20. The round baler of claim 17, wherein when the pressing apparatus moves toward the first end which has a greater amount of force from the pressing apparatus than the second end, the pre-tensioning apparatus pulls the pressing apparatus back toward the second end.

21. The round baler of claim 16, wherein the two of the multiple rollers are coupled to a carrier configured to pivot about an axis on the frame.

22. The round baler of claim 21, wherein the carrier is coupled rigidly with an arm that is pre-tensioned by a hydraulic cylinder.

23. A round baler comprising:
a frame;
a bale-forming chamber that is surrounded by a pressing apparatus in the form of a single pressing belt or multiple pressing belts arranged one next to the other, wherein the pressing apparatus contacts multiple rollers that can be driven and freely co-rotating rollers, of which at least one pre-tensioned roller is loaded by two springs with each of two ends of the at least one pre-tensioned roller being coupled to one of the two springs;
wherein in a balanced condition, the two ends of the at least one pre-tensioned roller bear substantially equal amount of forces from the pressing belts;
wherein in a unbalanced condition, the two ends of the at least one pre-tensioned roller bear different amount of forces, and then the springs are deformed and lead the pre-tensioned roller back the balanced condition;
wherein the pressing apparatus is endless and formed an enclosure area subject to be changed when baling, and the pre-tensioned roller is within the enclosure area; and
wherein one of the multiple rollers is positioned immediately before the pre-tensioned roller and another one of the multiple rollers is positioned immediately after the pre-tensioned roller and these two of the multiple rollers are outside the enclosure area.

24. The round baler of claim 23, wherein in the balanced conditioned, the pressing apparatus is substantially symmetric to the pre-tensioned roller.

25. The round baler of claim 23, wherein the positions of the ends of the pre-tensioned roller can each be detected by sensors that are connected to a display device, the sensors are rotational angle sensors.

26. The round baler of claim 23, wherein in the unbalanced condition, the pressing apparatus moves towards one of the two ends of pre-tensioned roller which has a greater amount of force from the pressing apparatus than the other end.

27. The round baler of claim 23, wherein the two of the multiple rollers are coupled to a carrier configured to pivot about an axis on the frame.

28. The round baler of claim 27, wherein the carrier is coupled rigidly with an arm that is pre-tensioned by a hydraulic cylinder.

* * * * *